March 20, 1934. F. W. LEE 1,951,760
METHOD OF CONDUCTING GEOLOGICAL SURVEY
Filed Dec. 9, 1929
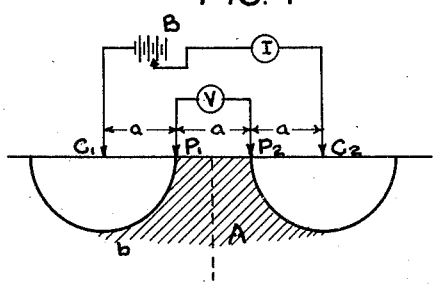
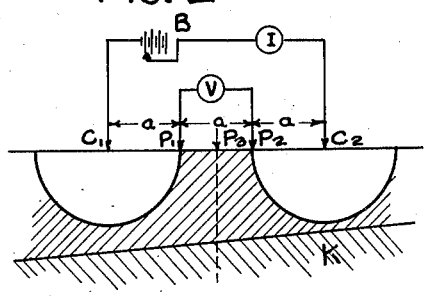
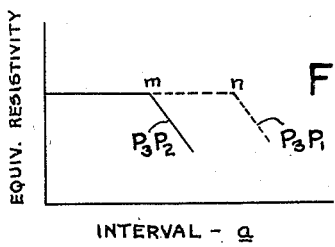
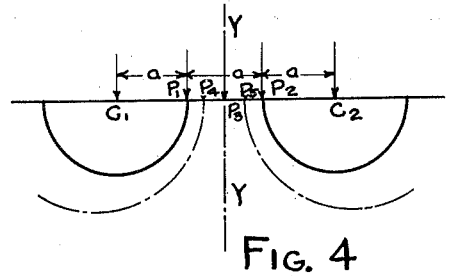
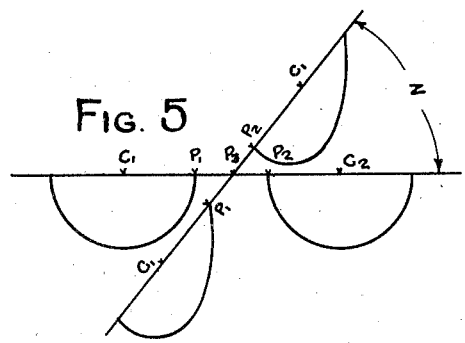
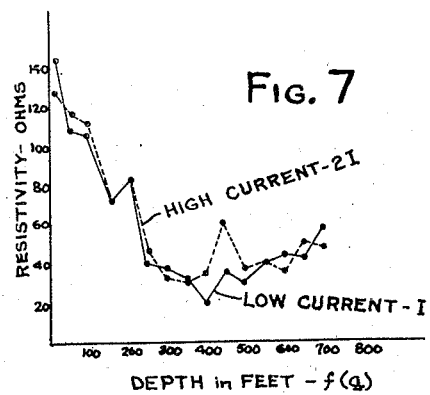
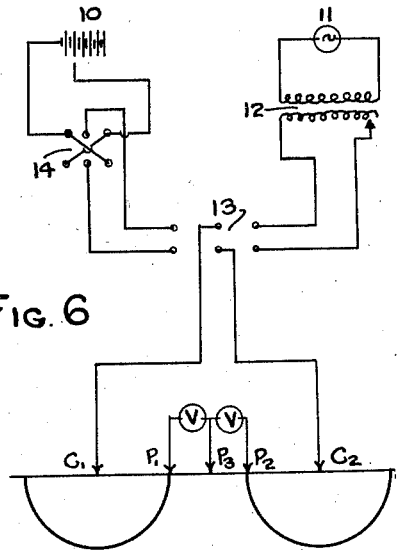
INVENTOR:
FREDERICK W. LEE
By /s/ Leon Edelson
ATTOR Patented Mar. 20, 1934

1,951,760

UNITED STATES PATENT OFFICE 1,951,760

METHOD OF CONDUCTING GEOLOGICAL SURVEY

Frederick W. Lee, Baltimore, Md.

Application December 9, 1929, Serial No. 412,761

7 Claims. (Cl. 175—182)

This invention relates to the determination of the contour and general nature of subterranean geological structures or bodies and more particularly to a method of determining the same by electrical resistivity measurements obtained at the surface of the ground or at other accessible points, such as in shafts, stopes, drifts and drill holes.

It is well known in the art that by supplying a source of potential to spaced connections to ground an indication may be obtained which relates to or is a function of the electrical resistivity of the ground. For this purpose it has been found convenient to pass a current through the ground by way of a pair of current stakes connected to ground and then measure the voltage between two potential points located between and arranged in line with the current stakes. In a homogeneous soil, the threads of current emanating from each potential point has a center which may be considered as terminating in an equipotential surface to form what is hereinafter referred to as a potential shell. The resistance between these potential shells is obtainable by applying Ohm's law and equals the ratio of the voltage between the potential shells to the current passing through the ground from one point of current application to the other. For simplicity of computation, the potential shells may be considered as of hemispherical form and if the intervals between the points of current application and their respective equipotential surfaces are chosen equal to each other and to the interval between the potential shells as measured along the ground surface, then the equivalent electrical resistivity may be computed by the well known formula $$2\pi \frac{V}{I} a,$$

wherein V represents the potential between the shells, I the current applied to the current stakes and $a$ the chosen interval. It is well known in the art that by increasing the distance $a$ the depth to which the equivalent resistivity is measured is also increased.

In the drawing:—

Figure 1 illustrates diagrammatically an arrangement for measuring the electrical resistivity of the ground;

Figure 2 illustrates diagrammatically a similar arrangement in proximity to a sub-strata the equivalent resistivity of which is to be determined;

Figure 3 are curves showing the relation between the equivalent resistivity and the depth to which the sub-strata shown in Figure 2 is explored;

Figure 4 illustrates diagrammatically an arrangement for measuring the electrical resistivity of the ground wherein the interval between the potential shells is divided into a greater number of parts than in the arrangement shown in Figure 2;

Figure 5 illustrates diagrammatically the manner of applying the arrangement of Figure 4 at various azimuth angles;

Figure 6 illustrates diagrammatically an arrangement for supplying alternating or direct current to ground or various values of applied voltage, either alternating or direct, to the ground; and Figure 7 are graphs showing the relation of resistivity to depth for various values of current supplied to ground.

Referring more particularly to Figure 1 which illustrates diagrammatically one manner of measuring the electrical resistivity of the ground, it will be observed that current stakes are applied to the ground at the points $C_1$ and $C_2$ and supplied by a variable source of potential B. For the purpose of obtaining an indication which is related to or is a function of the electrical resistivity of the ground, potential connections $P_1$ and $P_2$ are applied to the ground and the voltage V is measured therebetween. The ratio $$\frac{V}{I}$$

is the resistance between the two potential shells arbitrarily shown in the figure as of hemispherical shape. The material, the resistivity of which is to be measured, is indicated in the figure by the hatched section. For simplicity of computation if the intervals $C_1$ $P_1$, $C_2$ $P_2$ and $P_1$ $P_2$ are each chosen equal to $a$ then the equivalent electrical resistivity of the hatched portion $P_1$ $P_2$ between the potential shells is equal to $$2\pi \frac{V}{I} a.$$

If, however, the intervals $a$ are not chosen equal to each other, the formula for computing the equivalent resistivity becomes somewhat more involved. With $P_3$ located equidistantly between $P_1$ and $P_2$, the equivalent resistivity of the material between $P_1$ and $P_3$ or between $P_2$ and $P_3$ is equal to $$4\pi \frac{V_1}{I} a$$

wherein $V_1$ is the potential difference between $P_1$ and $P_3$ or between $P_2$ and $P_3$.

Experience, as well as theory, indicates that the greatest changes in the equivalent electrical resistivity are caused by material introduced at the point where the curvature of the normal equipotential surfaces is greatest, as at $b$. Thus, a new material coming into the influence of the zone $b$, as by changing the interval $a$, would be easily detected. On the other hand, the same material, if introduced at A, would show only slight measurable changes.

Figure 2 shows the location of a stratum of material K the resistivity of which differs from that of the hatched portion located between the potential shells. If this strata K slopes, as in Figure 2, it will be obvious that by increasing the interval $P_2 C_2$ the said stratum will enter the zone of influence of potential shell $P_2$ before it enters that of $P_1$. Hence, if the interval between $P_1 P_2$ is divided into symmetrical parts, preferably in halves, as in Figure 2, and the resistivity measured between $P_3 P_1$ and $P_3 P_2$, the stratum K will first show its effect in the equivalent electrical resistivity between the points $P_3$ and $P_2$ for a certain value of $a$ before it will show its effect in the measured resistivity between the points $P_3$ and $P_1$. Only by increasing the interval $a$ for potential shell $P_1$ will the stratum K show any effect upon the equivalent electrical resistivity as measured between the points $P_3$ and $P_1$.

If a curve is plotted between equivalent electrical resistivity for the material K of Figure 2 and the interval $a$, it will be observed that the change of resistivity occurs at the smaller value of $a$ for the interval $P_3 P_2$ than for the interval $P_3 P_1$. This curve is shown in Figure 3, the points of change in resistivity being indicated at $m$ and $n$. Had the resistivity of the material K been higher instead of less than its overlying strata of homogeneous soil, the curves of Figure 3, at the points $m$ and $n$, would turn upwardly instead of downwardly.

This invention contemplates partitioning the ground preferably into symmetrical parts, as shown in Figures 2 and 4. It is not necessary, however, in the practice of this invention to partition the ground into exactly equal or symmetrical parts in order to determine variations between the resistivities of such portions as are being compared. In other words, in arrangements such as are shown in Figures 2 and 4 the intervals $a$ are not necessarily equal. In those cases where the intervals $a$ are not equal, it is merely necessary to employ a separate resistivity formula for each portion undergoing comparison, the separate formulas so employed being of such character as to automatically compensate for any dissymmetry in the intervals $a$. It will be understood that the so called partitioning is carried out by locating suitable current and potential stakes at predeterminedly spaced intervals along the ground surface or in drill holes, shafts, wells and the like. In Figure 2 the ground between the potential shells is divided into halves to provide the intervals $P_1 P_3$ and $P_2 P_3$, whereas in Figure 4 the ground between the potential shells is divided into a greater number of parts to provide the intervals $P_1 P_4$, $P_4 P_3$, $P_3 P_5$, and $P_5 P_2$. In each case the idea is to compare one interval with the other. For example, in Figure 2 the interval $P_1 P_3$ would be compared to the interval $P_3 P_2$. On the other hand, in Figure 4 the interval $P_1 P_4$ might be compared with the interval $P_5 P_2$, $P_5 P_3$ or $P_3 P_4$. In making these comparisons one may utilize the equivalent resistivity values determined by computation as described above or any function of these values, such as measured potentials, currents or resistances. In other words, in the arrangement of Figure 2, the interval $P^1 P^3$ may be compared with the interval $P_2 P_3$ by comparing the ratio of potential differences between the points $P_1$ and $P_3$ and the points $P_2$ and $P_3$ for different divisions of $a$, the current being maintained constant throughout the comparison. It is obvious that the influence of the interval $P_4 P_3$ with respect to the interval $P_5 P_3$ extends to a greater depth or another function of the interval $a$, than does the interval $P_1 P_3$ with respect to the interval $P_3 P_2$. Now by choosing the configuration of Figure 4 to be applied at various azimuth angles $z$ measured on the ground surface, as shown for example in Figure 5, and then comparing the symmetry or lack of symmetry in the various directions, a clear delineation of the geological structure is made possible.

There are two primary methods for applying the herein disclosed principles for determining the nature and contour of subterranean geological structures or bodies. In one of the methods the interval $a$ is maintained a constant value as in the arrangement shown in Figure 2, this arrangement as a unit being then moved over the surface of the ground whereby to explore various areas of the ground in each direction to a certain fixed depth. This permits the determination of the perimetral configuration or the lateral boundaries of an ore body or strata located below the surface of the ground, but does not permit exploration to a variable depth.

In the second method of applying the principles of the present invention an arrangement like that shown in Figure 4 is employed wherein the axis of symmetry Y—Y is maintained fixed at all times and the interval $a$ is expanded or contracted with respect thereto. This permits exploring the ground to the variable depth but does not permit exploration to an extent sufficient to determine the lateral boundaries or perimetral configuration of a subterranean strata.

Inasmuch as the volt-ampere characteristic, as well as polarization, is different when measured on alternating current than when measured on direct current, and also different for various values of applied voltage, whether alternating or direct, I have provided a system of measurement which still further differentiates a various strata or parts of geological structures or bodies which are introduced upon changing the interval $a$. This system is illustrated in Figure 6 wherein a battery or other suitable source 10 of direct current is employed to supply a variable current to the ground at various voltages in order to ascertain the resistivity characteristics of the ground. There is also employed in the same arrangement an alternator 11 of variable frequency across the terminals of which is connected a transformer 12 for supplying varying values of alternating current to the ground. A double-pole double-throw switch 13 is also arranged with respect to the source 10 of direct voltage and the source 11 of alternating voltage as to selectively permit either direct or alternating current to be supplied to the ground. Suitably interposed between the switch 13 and the source 10 of direct voltage is a reversing switch 14 which is operative to reverse the direct current for the purpose of computing the polarization voltage. This polarization voltage may then be allowed for in computing the resistance from which latter the resistivity is determined.

In the simplest application of the invention the procedure is substantially as follows. There is first selected some point ($P_3$ of Figure 2) on the ground, after which are selected two additional points $P_1$ and $P_2$, arranged preferably symmetrically with respect to the point $P_3$. Thereafter two additional points $C_1$ and $C_2$ are selected, these latter points being also arranged preferably symmetrically with respect to the central point $P_3$.

Having selected these five points, an electric current is applied to the points $C_1$ and $C_2$. This current may be direct, alternating or pulsating. If a direct current is employed it is of constant strength. If an alternating current is employed it is of constant amplitude and if a pulsating current is used it is of constant impulse. Having applied the current to the points $C_1$ and $C_2$ the applicant then measures (1) the current applied at $C_1$ and $C_2$, (2) the potential between $P_3$ and $P_2$, and (3) the potential between $P_3$ and $P_1$.

From the reading so obtained the applicant computes the apparent resistivity of the ground between the points $P_3$ and $P_2$ and also between the points $P_3$ and $P_1$. This resistivity is plotted as a function of $a$. By changing the value of $a$ the effect of symmetry alters. If the ground were complete homogeneous there would be no difference between the resistivity as measured between $P_3$ and $P_1$ and as measured between $P_3$ and $P_2$. As the distance $a$ is gradually increased it is found that the ground in general is not homogeneous and the lack of symmetry is shown by the change in resistivity values which develop about this configuration.

The measurement is repeated with another current value one-half or twice as much as that originally employed and the resistivity between $P_3$ and $P_1$ and also between $P_3$ and $P_2$ is again computed.

Since the volt-ampere characteristic is different for various ground formations further insight is gained by the material causing this change of symmetry. Thus, in Figure 2, the change in symmetry due to a new material K would be first noted between $P_3$ and $P_2$ and later between $P_3$ and $P_1$ as the interval $a$ was increased. There would thus be obtained an indication of the direction in which the strata K is dipping. As set forth above, the procedure contemplates the partitioning of the ground and the measurement of the apparent resistivity or function of the same, such as the volt-ampere ratio of two sides about a plane passing through $P_3$ chosen arbitrarily between two current stakes. By so partitioning the ground the field is split into two distinct and independent halves, preferably wholly symmetrical halves, which allow their usual comparison without altering the current field and thereby introducing disturbing factors. This permits the recognition of dis-symmetry between the two parts and discovery of stratagraphic details hidden or impossible of ascertainment by other known methods.

In making measurements, good electrical technique is used. The method of measuring potential differences may be done with a potentiometer which under a balanced condition does not disturb the form of the field. A bridge method or even a voltmeter may suffice if proper corrections are made for the resistances in the potential circuit. It is very desirable that the ratio of potential difference between $P_1$ and $P_3$ and between $P_3$ and $P_2$ to the current applied at $C_1$ and $C_2$ represents the actual field condition. If the field is disturbed by such procedure it should be corrected for by proper electrical technique.

Figure 7 illustrates a typical graph showing the relation of resistivity to measured depth, this being the full line graph. By increasing the current to twice the value of that employed in obtaining said full line graph, a second graph is obtained, this second graph being indicated by the broken line. It will be observed that for certain given depths to which the sub-strata is explored different values of resistivity are obtained for the low and high values of currents employed. For instance, at a depth of 100 feet the resistivity when current I is employed is in the neighborhood of 105 ohms whereas when a current of the value 21 is employed the measured resistivity is approximately 110 ohms. On the other hand, at the depth of 300 feet it will be observed that the resistivity corresponding to the higher value of current is lower than that which corresponds to the lower value of current. At 150 feet and at 550 feet the graphs of Figure 7 indicate that the resistivity of the sub-strata at those depths was the same irrespective of the value of the current employed. An analysis of the graph shown in Figure 7 would thus indicate that the stratum encountered at the depth of 100 feet is different in character from that encountered at the depth of 150 feet.

Instead of employing different values of current in the manner illustrated by the graphs of Figure 7, the arrangement of Figure 6 may be employed to supply first an alternating current to ground and then a direct current to ground, the equivalent resistivity being ascertained for said alternating and direct currents at various depths. An analysis of the graphs so obtained might show a higher or lower value of resistivity at a given depth depending upon whether alternating or direct current was supplied to ground. If at a depth of 100 feet the ascertained resistivity for the alternating current differed from the ascertained resistivity for the corresponding value of direct current whereas at the depth of 200 feet the ascertained resistivity was the same for both alternating and direct current, it would be assumed that the sub-strata at the 200 feet depth differed in character from that at the 100 feet depth.

It will be understood, of course, that the method of determination of underground geological structure and characteristics as herein disclosed is susceptible of various modifications without involving a departure from the real spirit or principles of the invention and it is accordingly intended to claim the same broadly, as well as specifically, as indicated by the appended claims.

What is claimed as new and useful is:—

1. The method of determining the character of earth in various directions and at various depths or distances from a pair of current electrodes inserted into the earth which consists in comparing the resistivity of a portion of the earth located between a pair of spaced points with the resistivity of another portion of earth located between a second pair of spaced points, said pairs of points being respectively located at opposite sides of a straight line intersecting said pair of electrodes.

2. The method of determining the character of earth in various directions and at various depths or distances from current electrodes inserted into the earth which consists in comparing the resistivity of a portion of the earth located between a pair of spaced points with the resistivity of another portion of earth located between a second pair of spaced points, said pairs of points being respectively symmetrically located at opposite sides of a plane disposed midway between a pair of current electrodes and extending in a direction normal to a straight line intersecting said pair of electrodes.

3. The method of determining the character of earth in various directions and at various depths or distances from current electrodes inserted into the earth which consists in comparing the resistivity of a portion of the earth located between a pair of potential shells with the resistivity of another portion of earth located between a second pair of potential shells, said pairs of potential shells being respectively located at opposite sides of a plane disposed midway between a pair of said current electrodes and extending in a direction normal to a straight line intersecting said pair of current electrodes.

4. The method of determining the character of a subterranean geological structure or body which consists in comparing the resistivity of one portion of said structure or body with that of another portion of said structure or body, the portions so compared being respectively located in zones surrounding separate current electrodes or terminals.

5. The method of determining the direction in which changes in subterranean geological structures or bodies appear which consists in establishing a plurality of spaced equipotential shells, in partitioning the area located between a non-enveloping pair of said shells into predetermined sections, in determining the resistivity of each of said sections, and in comparing the resistivity of one of said non-enveloping sections with that of another of said sections whereby to obtain an indication of a change both in magnitude and in direction of the geological structures or bodies undergoing comparison.

6. The method of determining the direction in which changes in the character of subterranean geological structures or bodies occur which consists in establishing a pair of non-enveloping equipotential shells, in partitioning the area between said shells into predeterminedly fixed intervals, in respectively measuring the resistivities of the structures or bodies located within said intervals, and in comparing the resistivities so obtained whereby to obtain an indication of the direction in which changes in the character of the structures compared occur.

7. A method of conducting geological or geophysical surveys of subterranean structures or bodies which consists in comparing the equivalent resistivity values in various non-enveloping potential shells arranged at opposite sides of the ideal plane of symmetry.

FREDERICK W. LEE.